US008259534B2

(12) United States Patent
Lisitsyn et al.

(10) Patent No.: US 8,259,534 B2
(45) Date of Patent: Sep. 4, 2012

(54) GENERATOR DEVICE FOR MARINE GEOPHYSICAL RESEARCH

(75) Inventors: Evgenij Dmitrievich Lisitsyn, St. Petersburg (RU); Andrej Vladimirovich Tulupov, Moscow (RU); Alexandr Arkadevich Petrov, St. Petersburg (RU); Vladimir Eduardovich Kyasper, St. Petersburg (RU)

(73) Assignee: "Emmet" JSC, Moscow (RU)

( * ) Notice: Subject to any disclaimer, the term of this patent is extended or adjusted under 35 U.S.C. 154(b) by 874 days.

(21) Appl. No.: 12/378,303

(22) Filed: Feb. 14, 2009

(65) Prior Publication Data

US 2009/0262031 A1    Oct. 22, 2009

(30) Foreign Application Priority Data

Apr. 22, 2008    (RU) .................................. 2008115157

(51) Int. Cl.
    *G01V 1/38*    (2006.01)
(52) U.S. Cl. .................... 367/147; 367/142; 324/365
(58) Field of Classification Search ............ 367/18, 367/142, 147, 170; 324/332, 347, 365
    See application file for complete search history.

(56) References Cited

U.S. PATENT DOCUMENTS

| 3,435,410 | A | * | 3/1969 | Babb ........................ 367/18 |
| 3,563,334 | A | * | 2/1971 | McCarter ................. 181/118 |
| 3,615,959 | A | * | 10/1971 | Nance ........................ 141/7 |
| 3,728,671 | A | * | 4/1973 | Poston, Jr. ................. 367/147 |
| 4,040,000 | A | * | 8/1977 | Dwivedi .................... 367/142 |
| 7,109,717 | B2 | * | 9/2006 | Constable ................ 324/337 |
| 7,705,599 | B2 | * | 4/2010 | Strack et al. .............. 324/348 |
| 2010/0102820 | A1 | * | 4/2010 | Martinez et al. ......... 324/334 |
| 2010/0172205 | A1 | * | 7/2010 | Hillesund et al. ........ 367/15 |

FOREIGN PATENT DOCUMENTS

| CA | 2307557 | 5/1999 |
| RU | 2253881 | 6/2005 |
| RU | 53460 | 5/2006 |
| SU | 213940 | 3/1968 |
| WO | WO 2005006022 A1 * | 1/2005 |

\* cited by examiner

*Primary Examiner* — Ian Lobo
(74) *Attorney, Agent, or Firm* — Aleksandr Smushkovich

(57) ABSTRACT

The generator device is proposed for seabed survey, comprising a generator line, including electrodes, a hoist, hydraulic pump, air compressor, and at least one hose joined to the generator line, situated optionally inside or outside the line. The hose includes a through hydro-channel therein, a stationary end connected to the pump or alternatively to the compressor, and a running end furnished with a discharge valve. Connecting to the compressor ensures positive floatation of the generator line, whereas connecting to the pump ensures negative floatation thereof. In preferred embodiments, the device comprises a hydraulic clutch and a faucet. The hose communicates with the pump and compressor through the clutch and faucet, ensuring alternative communication of the hose's hydro-channel with water or air for filling thereof. The generator line comprises a dipole including one power braiding, and an initial part including two power braidings, the braidings are connected to the electrodes.

4 Claims, 1 Drawing Sheet

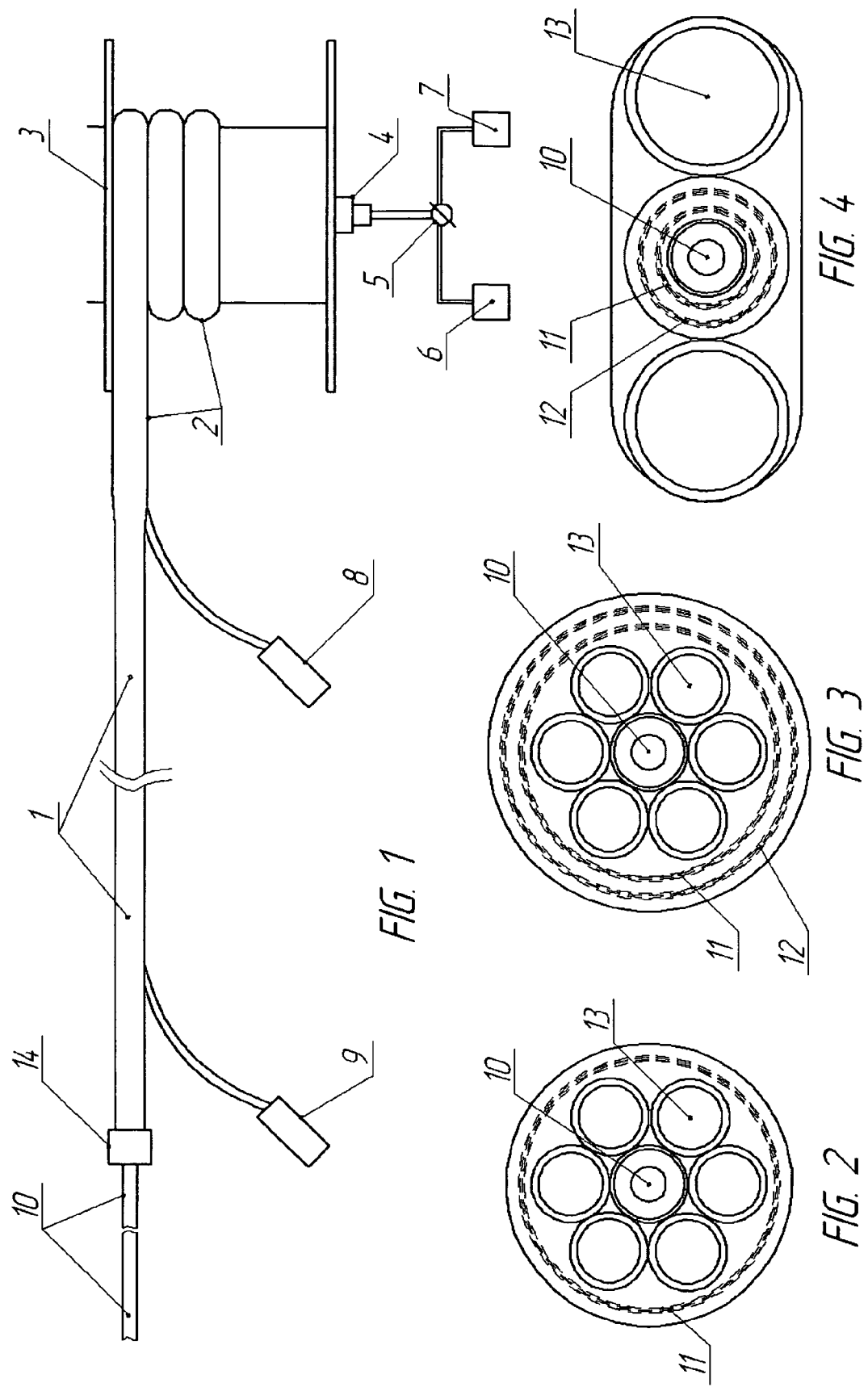

GENERATOR DEVICE FOR MARINE GEOPHYSICAL RESEARCH

CROSS-REFERENCE TO RELATED APPLICATION

This U.S. patent application claims priority under 35 U.S.C. 119 (a) through (d) from a Russian Federation patent application No. RU2008115157 filed on 22 Apr. 2008, which application is hereby incorporated by reference in its entirety.

FIELD OF THE INVENTION

The invention is related to the field of geophysical exploring, in particular, to equipment complexes for carrying out geo-electrical survey by methods of induced polarization, resistances, and field formation, and is intended for improvement of prognosis of hydrocarbons deposits, searching for placers and deposits of materials usable in construction.

BACKGROUND OF THE INVENTION

There are known generator devices for geophysical research, including a generator line made of cable and provided with electrical load that, in case of significant depths, allows to place a generator dipole at a distance less than 100 m from the bottom, which ensures effective operation with bottom systems located on the seabed in a start-stop mode. The disadvantage of such generator devices is insufficient universality. In particular, they cannot be used in the near-shore zone and in the shelf zone.

There is known a generator device for geophysical research, deployable during movement of the vessel, carrying the device (patent RU2253881), in which device both branches of a generator line, connected with generator electrodes, are made of cable provided with floats, or of floating cable. Such structure of the generator line ensures high productivity and operative technological effectiveness. However, in case of high-level disturbances, for example, wind-induced waves, significant spatial averaging of signals along the profile is required, that substantially reduces resolution capacity of the survey.

Another generator device is known, including a generator line made of cable provided with floats or of floating cable, and a receiving line, which is submerged onto the bottom. However, such device has limitations in depth and also lacks universality.

BRIEF DESCRIPTION OF THE INVENTION

Therefore, it is desirable to create a generator device that would allow adjusting floatability of the generator line and would allow operating both during the vessel movement and in the start-stop mode, depending on the research goals.

Herein, an inventive generator device is proposed with variable floatability. The device comprises a generator line (GL), including a dipole part. The GL is designed in a special way that provides joining the generator line along its length with at least one hose internally having a hydro-channel. The hose includes a stationary end communicated essentially with a hydraulic pump or an air-compressor; and includes a movable ('running') end provided with a valve. Preferably, the stationary end is connected to the hydraulic pump or the compressor via a hydraulic clutch and a faucet, though other embodiments might instead include similar conventional means.

The hose(s) may be placed inside the GL, and/or outwardly attached thereto. The volume of the internal space of the hydro-channel and the structure of the dipole part are preferably chosen in such a way, that when the hydro-channel has been filled with air, the dipole part would have a positive floatability of at least 5%, and when it has been filled with water it would have a negative floatability of at least 5%.

DESCRIPTION OF DRAWINGS

FIG. 1 represents a general scheme of the generator device with placement of the hose inside the GL, according to an embodiment of the present invention.

FIG. 2 represents a cross-sectional view of the internal structure combining the GL and the hose, according to an embodiment of the present invention.

FIG. 3 represents a cross-sectional view of the internal structure combining the GL and the hose, according to another embodiment of the present invention.

FIG. 4 represents a cross-sectional view of the internal structure combining the GL and the hose, according to another embodiment of the present invention.

Each reference numeral indicated on FIGS. 1-4 denotes an element of the inventive device described herein below. A first time introduced reference numeral in the description is enclosed into parentheses.

DESCRIPTION AND OPERATION OF PREFERRED EMBODIMENTS

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Referring to FIG. 1, in a preferred embodiment, the inventive device comprises: a generator line (further called 'GL'), having a dipole part (1) and a beginning part (2); a hoist (3) stationed on a carrying vessel (not shown). The hoist 3 includes a rotatable axle and a drum fixed to the axle. The drum is coupled to a hydraulic clutch (4), which is joined with the help of a system of hoses through a faucet (5) with a hydraulic pump (6) and alternatively with a compressor (7).

The inventive device comprises generator electrodes (8) and (9). The dipole part 1 is connected with the generator electrodes 8 and 9.

As shown on FIG. 2, in some embodiments, the GL includes a shell enclosing: (a) a multi-strand reinforced cable (10) serving for connection of additional devices, for example, a buoy with a GPS indicator or a an acoustic beacon, also known as a 'pinger'; (b) a power braiding (11) (braided wiring), for example made of copper, and connected with the electrode 9 (a 'distant' electrode, shown on FIG. 1), distant from the vessel carrying the inventive device; and (c) a number of hoses (13) with internal hydro-channels.

Alternatively, an additional power braiding (12) may be placed inside the beginning part 2, concentrically and externally to the braiding 11, as illustrated on FIG. 3. The running end of the braiding 12 is connected to the electrode 8 (a 'proximate' electrode, shown on FIG. 1) located in proximity to the vessel. Such structure of the beginning part ensures a constancy of geometric dimensions of the generator line, excludes parasitic inductiveness that otherwise would be caused by cable coils located on the drum of the hoist 3, and prevents magnetization of the drum. The length of the beginning part may vary from tens to hundreds meters, depending on the sea depth.

In other embodiments (depicted on FIG. 4), at least one hose 13 with a hydro-channel (FIG. 4 shows two hoses 13 with corresponding hydro-channels) can be placed inside or outside (on its outer surface) the GL shell, provided at the GL's running end with a discharge valve (14) (shown on FIG. 1), actuated by a predetermined excess pressure inside the hydro-channels.

The length of the dipole part 1, depending on the necessary depth of research, may vary from tens to hundred meters. The overall volume of the hydro-channels of hoses 13 and the structure of the dipole part 1 are chosen in such a way, that at filling of the hydro-channels with air the dipole part would have a positive floatability of at least 5%, and at filling with water it would have a negative floatability of at least 5%.

The hydro-channels of hoses 13 at the stationary ends are connected to the hydro-clutch 4 (shown on FIG. 1), mounted on the axle of the hoist's drum and ensuring the system functioning in the process of winding-unwinding.

For deep-water researches, additional hydro-channels (not shown) may be placed in the GL's beginning part between the braiding 12 and braiding 11, serving for withdrawing excessive heat from the beginning part, located on the hoist drum. Both power braidings 12 and 11, and the multi-strand cable 10 are passed out from the GL's stationary end through connectors (not shown), for example, to the flat side of the drum for connecting to a generator of current pulses (not shown), and connecting necessary auxiliary equipment.

The device functions as follows. In the initial state, the hydro-channels of hoses 13 are filled with air. As the vessel comes on the line of prescribed profile, the dipole 1 and the beginning part 2 are removed from the vessel and placed on the water surface, providing the GL would remain afloat. During the vessel movement, the aforementioned generator of current pulses is operatively connected to the GL, and operation is carried out according to standard methods.

Operation in the start-stop mode is carried out as follows. As in the above-described method, the generator line in the initial state of positive floatability is towed behind the vessel to the prescribed point of profile. As the vessel arrives at this point, the faucet 5 is switched to the position of connection to the hydraulic pump 6. The hydraulic pump 6 is switched on and fills the hydro-channels of hoses 13 with outboard water that ensures laying the dipole 1 part on the sea bottom along the profile line or its moving into the upright position. Air from the hydro-system is discharged through the valve 14. Thereafter, the vessel comes to anchors, in case of operation at small depths, or remains at the point in the dynamic positioning mode in case of operation at great sea depths.

A necessary length of the GL initial part is slacked away for exclusion of influence of the vessel's evolutions onto the GL's configuration. The generator line is connected to an electrical current source thereby providing excitation of the surrounding medium during a necessary time period. After the end of operation at the prescribed point, the current source is disconnected from the generator line, the faucet 5 is shifted to the position for inletting air from the compressor 7 and the blowing of the hydro-channels of hoses 13 is provided. Water from the hydro-system is forced out through the discharge valve 14. The beginning part 2 is elevated until the full emersion of the GL on the surface or at a prescribed depth. Thereafter, the vessel moves to the next point of excitation, where the sequence of actions can be repeated.

We claim:

1. A generator device for marine geophysical research comprising:
    a generator line, including a shell and generator electrodes;
    a hydraulic pump;
    an air compressor;
    at least one hose including
        a stationary end connected essentially to the hydraulic pump and to the air compressor, and a running end furnished with a discharge valve;
    a hydraulic clutch; and
    a faucet;
wherein said at least one hose is joined with the hydraulic pump and the air compressor through the hydraulic clutch and the faucet, ensuring alternative communication of said at least one hose with water or air for filling thereof.

2. A generator device for marine geophysical research comprising:
    a generator line, including a shell and generator electrodes;
    a hydraulic pump;
    an air compressor;
    at least one hose along its length joined to the generator line, wherein said at least one hose including a stationary end connected essentially to the hydraulic pump and to the air compressor, and a running end furnished with a discharge valve;
    a hydraulic clutch; and
    a faucet;
    wherein said generator line comprising—a dipole part including one power braiding, and—a beginning part including two power braidings; said dipole braiding and said beginning part braidings are connected to said generator electrodes.

3. The generator device according to claim 2, wherein said braidings of the beginning part are situated concentrically.

4. The generator device according to claim 3, wherein a number of additional hoses with discharge valves at their running ends are disposed between the power braidings of said beginning part, serving for withdrawal of excessive heat.

* * * * *